US011792303B1

(12) United States Patent
Rao et al.

(10) Patent No.: US 11,792,303 B1
(45) Date of Patent: Oct. 17, 2023

(54) FAST CLEAR MEMORY OF SYSTEM MEMORY

(71) Applicant: INTERNATIONAL BUSINESS MACHINES CORPORATION, Armonk, NY (US)

(72) Inventors: Rajat Rao, Bangalore (IN); Ashutosh Mishra, Lagrangeville, NY (US); Bulent Abali, Tenafly, NJ (US); Alper Buyuktosunoglu, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/937,388

(22) Filed: Sep. 30, 2022

(51) Int. Cl.
*H04L 69/04* (2022.01)
*H04L 67/568* (2022.01)

(52) U.S. Cl.
CPC ............ *H04L 69/04* (2013.01); *H04L 67/568* (2022.05)

(58) Field of Classification Search
CPC ................. H04L 69/04; H04L 67/56–67/5683
See application file for complete search history.

(56) References Cited

U.S. PATENT DOCUMENTS

| 7,447,814 B1 | 11/2008 | Ekman |
| 10,860,489 B2 | 12/2020 | Das et al. |
| 2007/0104212 A1* | 5/2007 | Gutman ............... G06F 12/0813 370/428 |
| 2018/0189202 A1* | 7/2018 | Yap ..................... G06F 13/4068 |
| 2021/0224191 A1* | 7/2021 | Wang .................. G06F 12/1072 |

FOREIGN PATENT DOCUMENTS

| CN | 112839230 A | 5/2021 |
| WO | 2020211000 A1 | 10/2020 |

OTHER PUBLICATIONS

Karyofyllis, Viktor, "Precompression: A Prelude to Cache Compression," Thesis, University of Toronto, 2020, (51 pages).
"Compressed Delta Data for Cache Write Back," IPCOM000179106D, IP.com, Feb. 6, 2009, 3 pages.
Malik, N., et al., "Algorithm for a Compressed Data Bus for Multiprocessors," IPCOM000122804D, IP.com, (Original Disclosure: IBM TDB, v41, n1, 01-98, p. 111-116), Jan. 1, 1998, (7 pages).

* cited by examiner

Primary Examiner — Clayton R Williams
(74) Attorney, Agent, or Firm — Griffiths & Seaton PLLC

(57) ABSTRACT

Various embodiments are provided herein for compressing data in latency-critical processor links of a computing system in a computing environment. One or more cache lines may be dynamically compressed at a lowest level of a networking stack based on one or more of a plurality of parameters prior to transferring a single-cache line, where the networking stack includes a framer and a data link layer.

17 Claims, 9 Drawing Sheets

FAST CLEAR MEMORY OF SYSTEM MEMORY

BACKGROUND

The present invention relates in general to computing systems, and more particularly, to various embodiments for compressing data in latency-critical processor links of a computing system in a computing environment using a computing processor.

SUMMARY

According to an embodiment of the present invention, a method for compressing data in latency-critical processor links of a computing system in a computing environment using a computing processor, is depicted. One or more cache lines may be dynamically compressed at a lowest level of a networking stack based on one or more of a plurality of parameters prior to transferring a single-cache line, where the networking stack includes a framer and a data link layer.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments are provided.

DETAILED DESCRIPTION OF THE DRAWINGS

Figure 1:
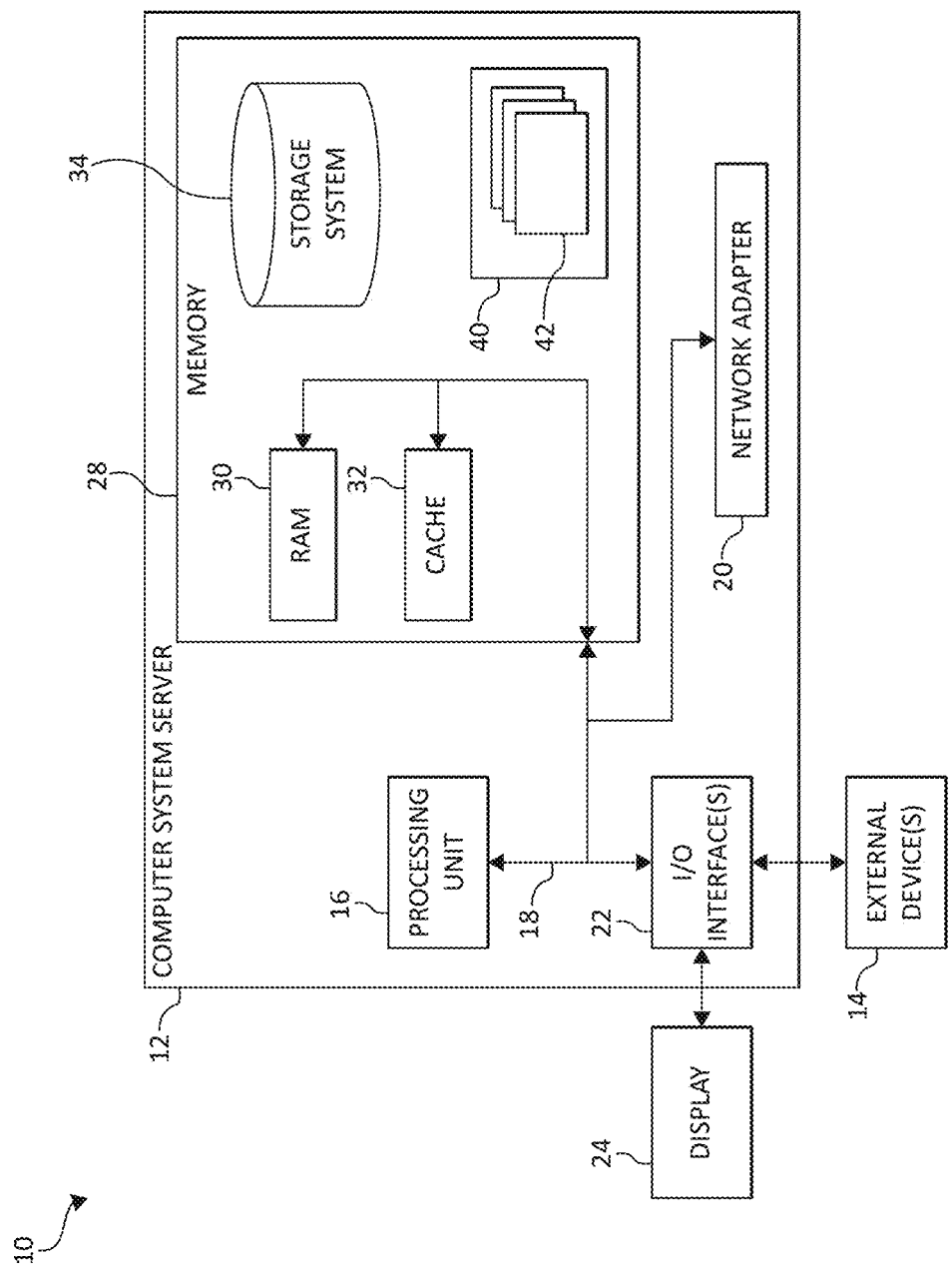
FIG. 1 is a block diagram depicting an exemplary cloud computing node according to an embodiment of the present invention.

In modern computer systems, a multi-processor system comprises multi-core central processing units (CPUs) in a single module. Typically, communication between the processors in the multi-processor system is via an inter-processor bus (also referred to as a processor link). The processors that are coupled via the processor link (i.e., a driver processor and a destination processor) are typically associated with I/O parameters that govern analog characteristics of a signal transmitted from the driver processor and the corresponding signal received at the destination processor. Characterizing the processor link during a testing/validation phase can help identify the best I/O parameters for reliably achieving desired performance levels.

Additionally, computer hardware caches are temporary holding storages for fast access to frequently used memory data. Said differently, to reduce or avoid the time delay (or "latency") of accessing data stored in the main memory of a computer, modern computer processors include a cache memory (or "cache") that stores recently accessed data so that it can be quickly accessed again by the processor. Data that is stored in a cache can be quickly accessed by a processor without the need to access the main memory (or "memory"), thereby increasing the performance of the processor and the computer overall. A cache has a shorter access time than the computer system memory (e.g., frequently referred to as dynamic random-access memory, "DRAM"). Caches are typically constructed with Static Random-Access Memory ("SRAM"), which are faster than DRAM. However, cache capacities are smaller than DRAM. The cache/memory access speed and capacity are inversely proportional.

Several different layers of cache may be provided in a computer system. Level 1 (or primary) cache, for example, is used to store data on behalf of system memory (which comprises random access memory, i.e., RAM) for access by a processor. Level 1 ("L1") cache can be built directly into the processor and can run at the same speed as the processor, providing the fastest possible access time. Level 2 (or secondary) ("L2") cache is also used to store a portion of system memory and may be included within a chip package but is separate from the processor. Level 2 cache has greater capacity than Level 1 cache but is slower. Some systems may even include Level 3 ("L3") cache that has even greater capacity than Level 2 cache. However, Level 3 cache is typically slower than Level 2 cache, yet still faster than the primary storage device, and may be located off the chip package.

Data in a cache are stored in "lines," which are contiguous chunks of data (i.e., being a power-of-2 number of bytes long, aligned on boundaries corresponding to this size). That is, data is typically transferred and accessed in groupings known as cache lines, which may include more than one item of data.

In typical computing architecture, a processor core may be connected to a cache (e.g., an on-chip cache or "nest"), which is in turn connected to the processor link ("link"). The nest and link are designed to operate at a much lower speed than the processor core. The nest may be a computing infrastructure that handles the transfer of data between the core and other cores, main memory, and input/output ("I/O") devices. The nest is responsible for maintaining coherency of data lines across the system. It is not an industry-standard term, so maybe we should define it better before using it. There are many data links in a computing system—Processor to IO links (PCIe, ethernet), Processor to memory links and Processor to Processor links. The nest includes all the infrastructure that handles these links. Thus, a link may be a connection that facilitates data transfer to/from a processor. In other words, in a computer system configuration, which shares the caches across different processors that are connected together by inter-processor links, there may be coherent transfer of cache data lines among processors.

Typical computing systems have a handshake protocol for the cache line transfer and only a limited number of requests over the link can be outstanding. Requests for cache line transfers are fulfilled but limited by the link speed. Since not all processor core computations require nest or link interaction, this provides a computer system performance with reasonable power consumption. However, when the processor core requests a cache line over the processor link, the speed mismatch negatively impacts the performance of the computer system. For example, physical limitations restrict the link speed, which is a combination of the number of serial lanes per link and the speed of operation.

Thus, the present invention provides for improving and optimizing the effective bandwidth and latency of such a constrained processor link, while reducing computing processor overheads, to improve and provide increased computing efficiency.

In this way, the present invention provides for increased computing system performance via latency reductions of a single cache-line transfer via lossless compression.

Accordingly, various embodiments are provided herein for compressing data in latency-critical processor links of a computing system in a computing environment using a computing processor, is depicted. One or more cache lines may be dynamically compressed at the lowest level of a networking stack based on one or more of a plurality of parameters prior to transferring a single-cache line, where the networking stack includes a framer and a data link layer. In some examples, data packets created for transfer over the link may be comprised of header information, cache line data, and some control information. The cache line data may be compressed while the other the other parts of the data pack (e.g., header, control flags) are not compressed. So, in effect, more of the cache line data can fit into a single data packet when compressed. That is, the cache lines may be dynamically compressed at the lowest level of the networking stack (framer/DLL) as opposed to application layer.

It should be noted, as used herein, a networking stack may be comprised of the following layers; 1) an application layer (the application layer may be the core and any software that runs), 2) a transport layer (the layer that handles the coherency of the data transfers—creates packets from the cache line data for transmission and processes the received packets to deliver to the application layer), 3) a data link layer (the layer that is responsible for guaranteeing error-free and in-order delivery of the data packets), and 4) a physical layer (the actual electrical circuit). Thus, a core may be the application layer, the nest may be the transport layer, and the link may be the link layer and the physical layer.

As such, the compression at the lower level is that it is purely a hardware ("HW")-driven mechanism without any intervention from the core or the software application.

In one example, the framer can be defined as a component/module that frames the data to transfer it over the link by adding some additional information in a pre-defined organization to allow the data to be processed on the receiving side. The DLL may be the data link layer.

In some examples, various embodiments provide for compressing data in the data link layer with framer feedforward. In some examples, various embodiments provide for compressing data in a framer with bus feedback. In some examples, various embodiments provide for dynamic compression toggling based on cache line contention. For example, an attacker may try to create frequent transfer of cache lines between processors to get information about its compressibility. If a high volume of transfers is observed in a particular address space, i.e. there is high contention for some cache lines, then it is safer to disable compression to prevent any leakage of information.

In this way, various embodiments provide for pipelined compression at the data link layer and enables compression in a computing system without any performance penalty. That is, the present invention provides for low latency compression on the data links without compromising security via side channels, as compared to just compressing on the cache all the time. By enabling dynamic compression operations on the data links, any real-time impact (positive or negative) of compression on performance may be evaluated thus enabling a corrective action/choice to be made to adjust the compression and reduce latency.

In some examples, various embodiments provide for compressing data at the data link level by using control signals at the link layer. That is, data may be dynamically compressed by dynamically adapting to the data link layer conditions to increase compression efficiency equal to or greater than the data link speed without compression in terms of latency.

In some examples, various embodiments provide for implementing compression at the link level to reduce link latency while not increasing the complexity of the cache implementation and keeping the overall cache data access latency equal or better than a system without compression. The cache line is considered as the smallest entity to operate on and hence can be implemented on link data.

It should be noted that one or more calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

In general, as used herein, "optimize" may refer to and/or defined as "maximize," "minimize," "best," or attain one or more specific targets, objectives, goals, or intentions. Optimize may also refer to maximizing a benefit to a user (e.g., maximize a trained machine learning scheduling agent benefit). Optimize may also refer to making the most effective or functional use of a situation, opportunity, or resource.

Additionally, optimizing need not refer to a best solution or result but may refer to a solution or result that "is good enough" for a particular application, for example. In some implementations, an objective is to suggest a "best" combination of operations, schedules, compression/decompression operations, and/or framer/DLL manager options, but there may be a variety of factors that may result in alternate suggestion of a combination of operations, schedules, compression/decompression operations, and/or framer/DLL manager options yielding better results. Herein, the term "optimize" may refer to such results based on minima (or maxima, depending on what parameters are considered in the optimization problem). In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
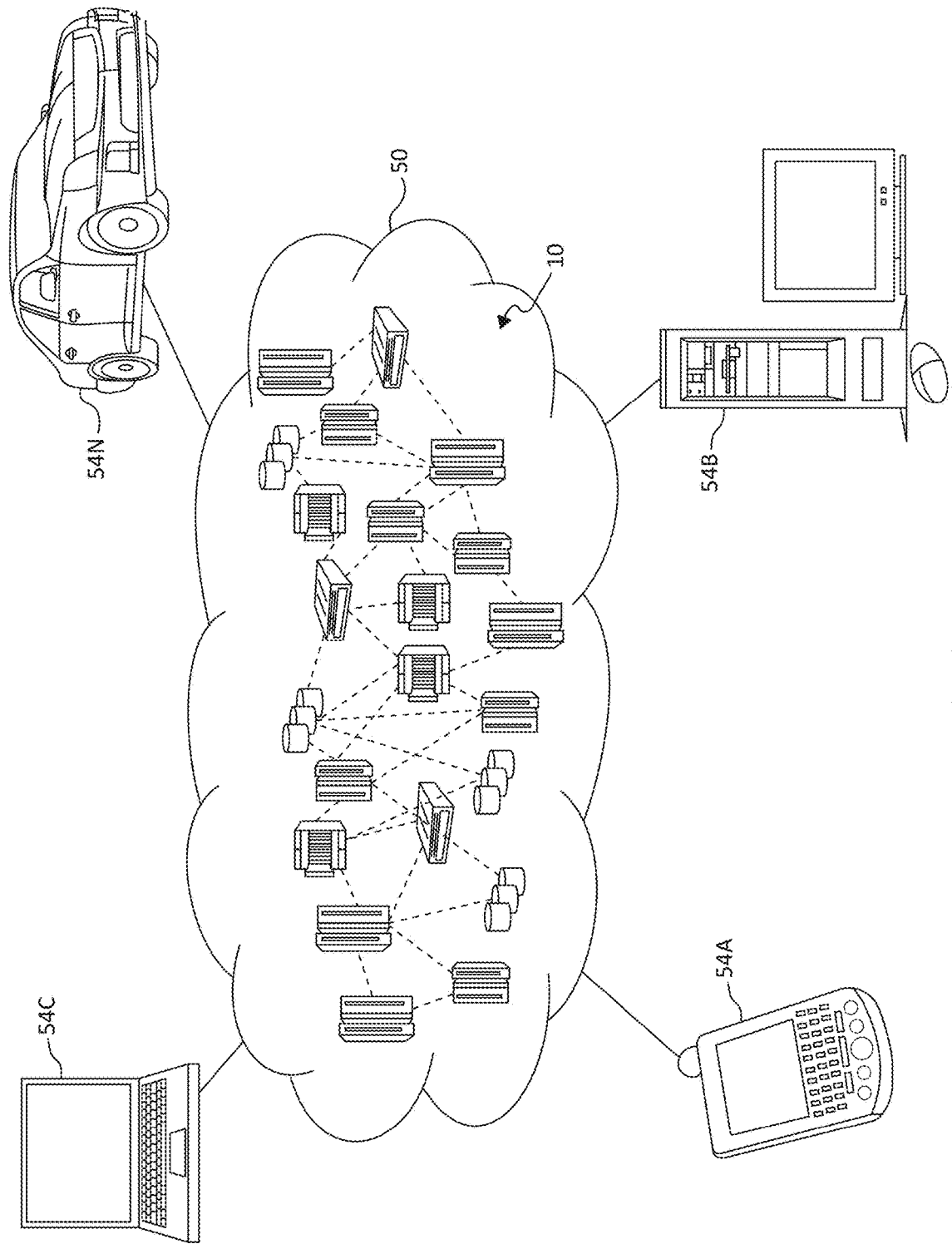
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
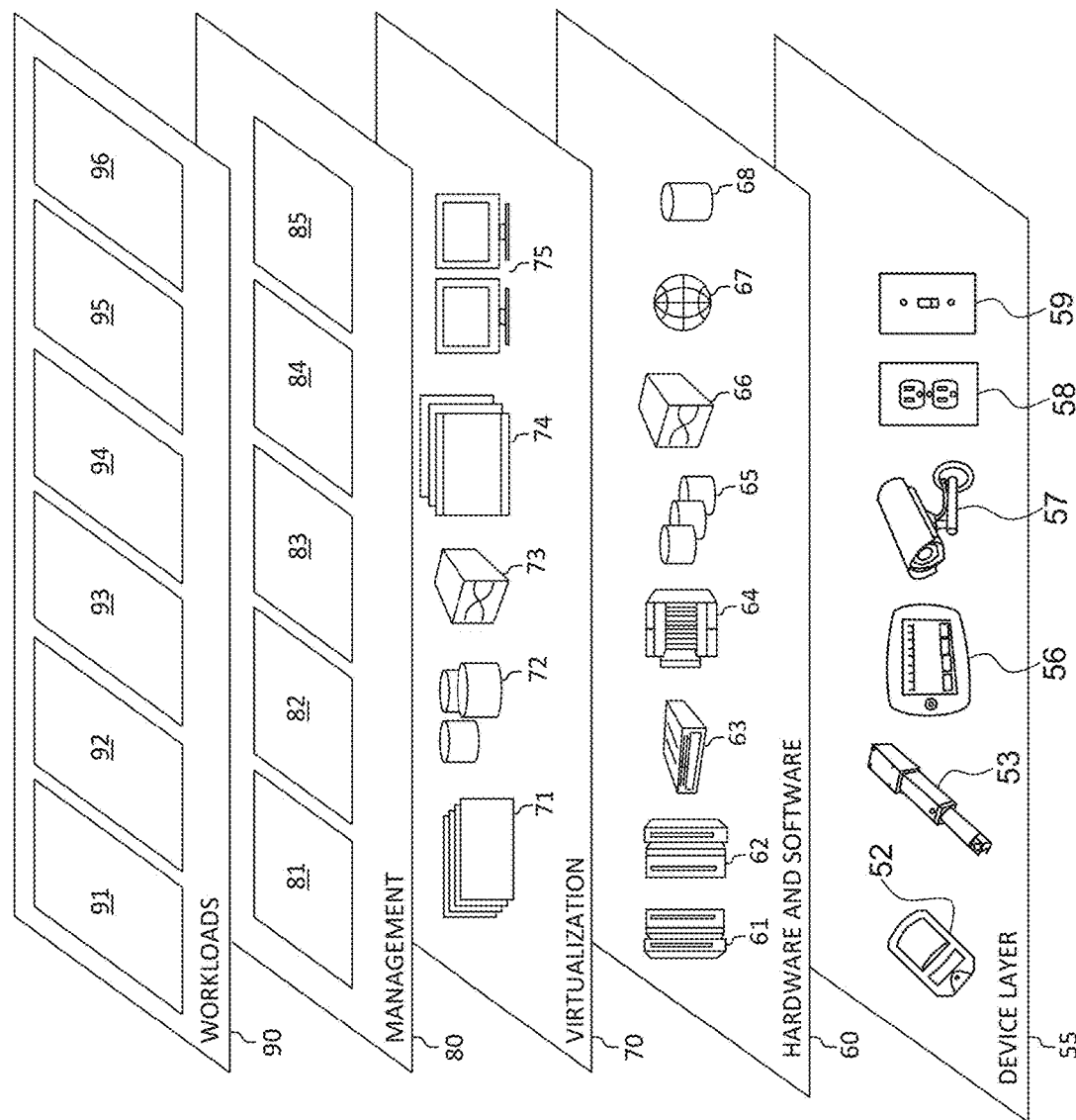
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for compressing data in latency-critical processor links of a computing system in a computing environment. In addition, workloads and functions 96 for compressing data in latency-critical processor links of a computing system in a computing environment may include such operations as interleaving and as will be further described, user and device management functions. One of ordinary skill in the art will appreciate that the workloads and functions 96 for compressing data in latency-critical processor links of a computing system in a computing environment may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously stated, the present invention provides novel solutions for improving and optimizing the effective bandwidth and latency of such a constrained processor link, while reducing computing processor overheads, to improve and provide increased computing efficiency. Accordingly, various embodiments are provided herein for compressing data in latency-critical processor links of a computing system in a computing environment using a computing processor, is depicted. One or more cache lines may be dynamically compressed at the lowest level of a networking stack based on one or more of a plurality of parameters prior to transferring a single-cache line, where the networking stack includes a framer and a data link layer. That is, the cache lines may be dynamically compressed at the lowest level of the networking stack (framer/DLL) as opposed to application layer.

In some examples, as described herein, the various embodiments are provided herein for dynamic compression of cache lines at the lowest level of the networking stack (framer/DLL) as opposed to application layer performed via pipelined compression. In some examples, data is feed from a framer to the DLL using that feed data to determine amount of compression to attempt. One or more queue levels in a framer may be monitored.

In some examples, as described herein, the various embodiments are provided herein for dynamic compression by dynamically toggling on or off the dynamic compression, which may be based on rate-matching. Various embodiments provide for compression operations designed with awareness of clocking differences between link and nest using the rate-matching. In some examples, as described herein, the various embodiments are provided herein for dynamic compression by preventing of timing side-channel attacks by dynamically controlling compression on hot cache lines (e.g., a cache line that is frequently transferred such as, for example transferred more than other cache lines, transferred above a predetermined threshold, transferred at or above a defined percentage, and/or an nth number of transfers in a defined period of time, etc., where n is a positive integer). That is, an attack that might make use of the time spent in performing a particular operation to gain additional information of the operation itself. Thus, if some amount of data is observed to be quickly transferred between processors, it indicates that the data has low entropy and the attacker can attempt to gain further information based on this low entropy.

Figure 4:
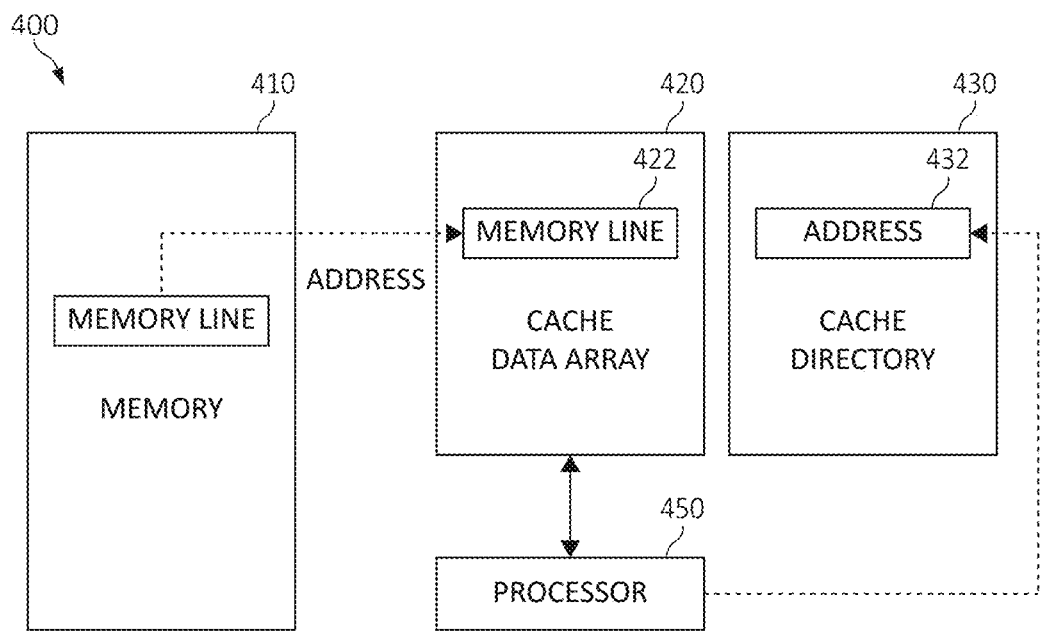
FIG. 4 is an additional block diagram depicting an exemplary functional relationship between various aspects of the present invention.

Turning now to FIG. 4, a block diagrams depicting exemplary functional components of a cache system 400 for use in compressing data in latency-critical processor links of a computing system in a computing environment according to various mechanisms of the illustrated embodiments is shown. In one aspect, one or more of the components, modules, services, applications, and/or functions described in FIGS. 1-3 may be used in FIG. 4. As will be seen, many of the functional blocks may also be considered "modules" or "components" of functionality, in the same descriptive sense as has been previously described in FIGS. 1-3.

The system 400 comprises of a memory 410, a cache 420 (e.g., cache data array) and a cache directory 430, all of which may be in communication with a processor 450.

Data in the cache 420 are stored in "lines," such as, for example, memory line 422, which are contiguous chunks of data (i.e., being a power-of-2 number of bytes long, aligned on boundaries corresponding to this size). A cache line 422 of memory data, typically in units of 64 to 256-bytes long, is stored in a data array location and the respective memory address is stored in the directory, as shown in FIG. 4. The processor 450 will supply the memory address to the cache such as, for example, the cache data array 420. If the address is found in the cache directory 430, the processor 450 may access a respective line of data in the cache 420. If the address is not found in the cache directory 430, the processor 450 may access the respective line of data in the memory 410.

Figure 5:
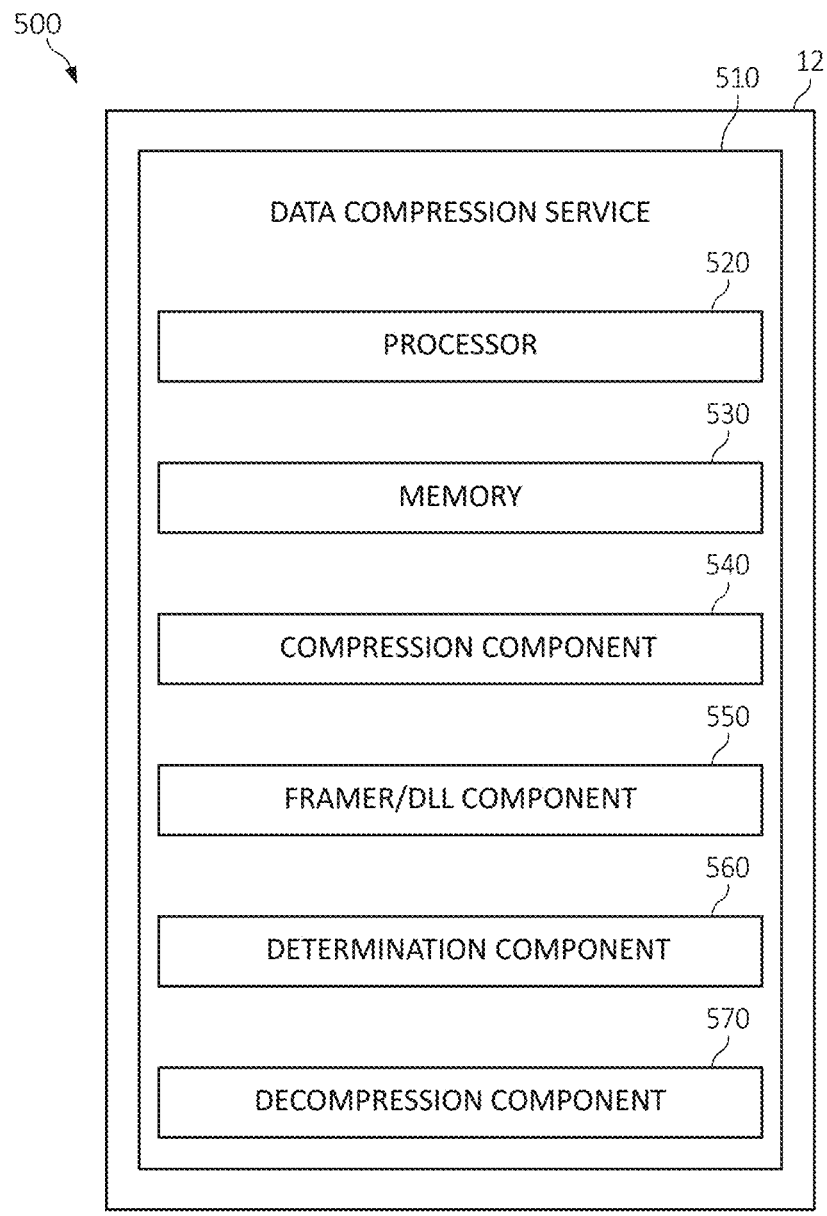
FIG. 5 is a block diagram depicting operations for compressing data in latency-critical processor links of a computing system in a computing environment according to an embodiment of the present invention.

Turning now to FIG. 5, a block diagram depicting exemplary functional components of system 500 for compressing data in latency-critical processor links of a computing system in a computing environment according to various mechanisms of the illustrated embodiments is shown. In one aspect, one or more of the components, modules, services, applications, and/or functions described in FIGS. 1-4 may be used in FIG. 5. As will be seen, many of the functional blocks may also be considered "modules" or "components" of functionality, in the same descriptive sense as has been previously described in FIGS. 1-4.

A data compression service 510 is shown, incorporating processing unit 520 ("processor") to perform various computational, data processing and other functionality in accordance with various aspects of the present invention. In one aspect, the processor 520 and memory 530 may be internal and/or external to the interleaving service 510, and internal and/or external to the computing system/server 12. The interleaving service 510 may be included and/or external to the computer system/server 12, as described in FIG. 1. The processing unit 520 may be in communication with the memory 530. The data compression service 510 may include a compression component 540, a framer/data link layer ("DLL") component 550, a determination component 560, and a decompression component 570.

In one aspect, the system 400 may provide virtualized computing services (i.e., virtualized computing, virtualized storage, virtualized networking, etc.). More specifically, the system 500 may provide virtualized computing, virtualized storage, virtualized networking and other virtualized services that are executing on a hardware substrate.

The data compression service 510 may, using the compression component 540, the framer/DLL component 550, the determination component 560, and the decompression component 570 may determine to compress one or more cache lines based on one or more of a plurality of parameters, where the plurality of parameters include a number of pending data packets, a quality of service ("QoS"), and a current packet type, where the current packet types are either a data packet or a control packet.

The data compression service 510 may, using the compression component 540, the framer/DLL component 550, the determination component 560, and the decompression component 570 may dynamically compress one or more cache lines at a lowest level of a networking stack based on one or more of a plurality of parameters prior to transferring a single-cache line, wherein the networking stack includes a framer and a data link layer.

The data compression service 510 may, using the compression component 540, the framer/DLL component 550, the determination component 560, and the decompression component 570 may enable compression of the one or more cache lines based on a data in a queue above a defined threshold, or disable compression of the one or more cache lines based on data in a queue below a defined threshold.

The data compression service 510 may, using the compression component 540, the framer/DLL component 550, the determination component 560, and the decompression component 570 may feed data from the framer to the data link layer to determine an amount of data to compress based on the one or more of the plurality of parameters.

The data compression service 510 may, using the compression component 540, the framer/DLL component 550, the determination component 560, and the decompression component 570 may dynamically toggle the compression of the one or more cache lines using a bloom filter on a set of previously transferred cache line addresses.

The data compression service 510 may, using the compression component 540, the framer/DLL component 550, the determination component 560, and the decompression component 570 may dynamically compressing one or more cache lines to match a data input rate.

The data compression service 510 may, using the compression component 540, the framer/DLL component 550, the determination component 560, and the decompression component 570 may dynamically controlling the compression of the one or more cache lines based on a number of hot cache lines.

Figure 6:
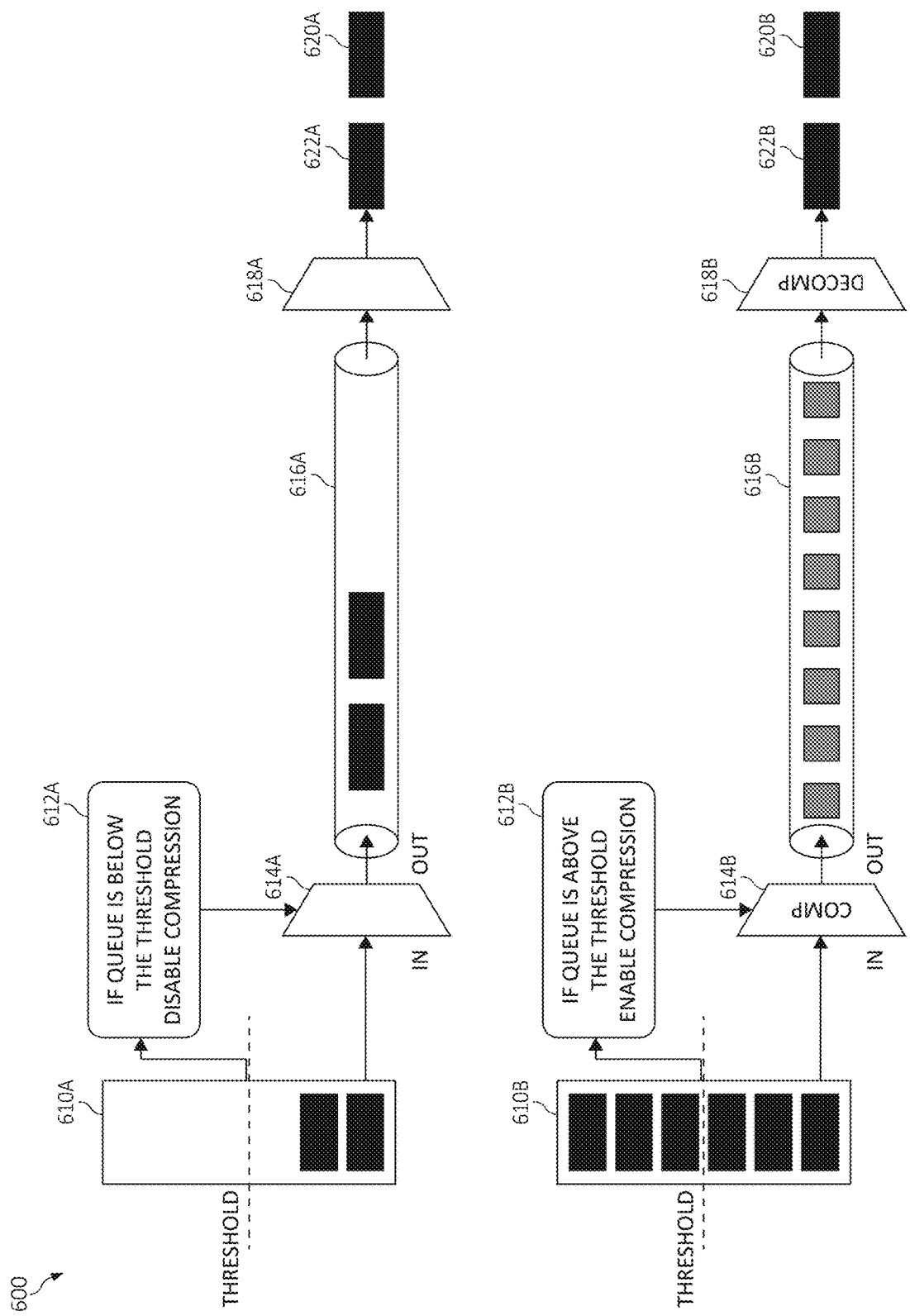
FIG. 6 is an additional block diagram depicting operations for compressing data in latency-critical processor links of a computing system in a computing environment according to an embodiment of the present invention.

For further explanation, FIG. 6 is a block diagram depicting operations for compressing data in latency-critical processor links of a computing system in a computing environment according to an embodiment of the present invention. In one aspect, one or more of the components, modules, services, applications, and/or functions described in FIGS. 1-5 may be used in FIG. 6. As shown, various blocks of functionality are depicted with arrows designating the blocks' of system 600 relationships with each other and to show process flow (e.g., steps or operations). Additionally, descriptive information is also seen relating each of the functional blocks' of system 600. As will be seen, many of the functional blocks may also be considered "modules" of functionality, in the same descriptive sense as has been previously described in FIGS. 1-5. Repetitive description of like elements employed in other embodiments described herein is omitted for sake of brevity.

With the foregoing in mind, the module blocks' of systems 600 may also be incorporated into various hardware and software components of a computing system, may also be in a cloud computing environment in accordance with the present invention. Many of the functional blocks of systems 600 may execute as background processes on various components, either in distributed computing components, or elsewhere.

As depicted, in a first example of the system 600, a framer 610A, at the data link layer, is depicted for receiving data packets (e.g., receiving data from a processor core not shown for illustrative convenience). A queue 612A may exist in the framer 610A where the queue 612A may be monitored. A determination operation may be executed in the queue 612A to determine if the data (e.g., number of data packets in the queue 612A) are below a threshold to disable compression. If yes, a decision is determined to disable compression and a compressor 614A bypasses compression of data in the queue 610A and transfers the data 616A to a parser 618A that receives the non-compressed data, for example, 620A and 622A. In one example, the threshold may be dynamically set as an average compressibility of previous packets multiplied/times the number of clocks taken to compress a single packet.

In a second example of the system 600, a framer 610B, at the data link layer, is depicted for receiving data packets (e.g., receiving data from a processor core not shown for illustrative convenience). A queue 612B may exist in the framer 610B where the queue 612B may be monitored. A determination operation may be executed in the queue 612B to determine if the data (e.g., number of data packets in the queue 612B) are above a threshold to enable compression. If yes, a decision is executed to enable compression and the data may be sent to a compressor 614B and a cache line may be dynamically compressed. The compressed cache lines 616B may be transferred to a parser 618B for decompressing one or more cache lines such as, for example, 620B and 622B.

Figure 7:
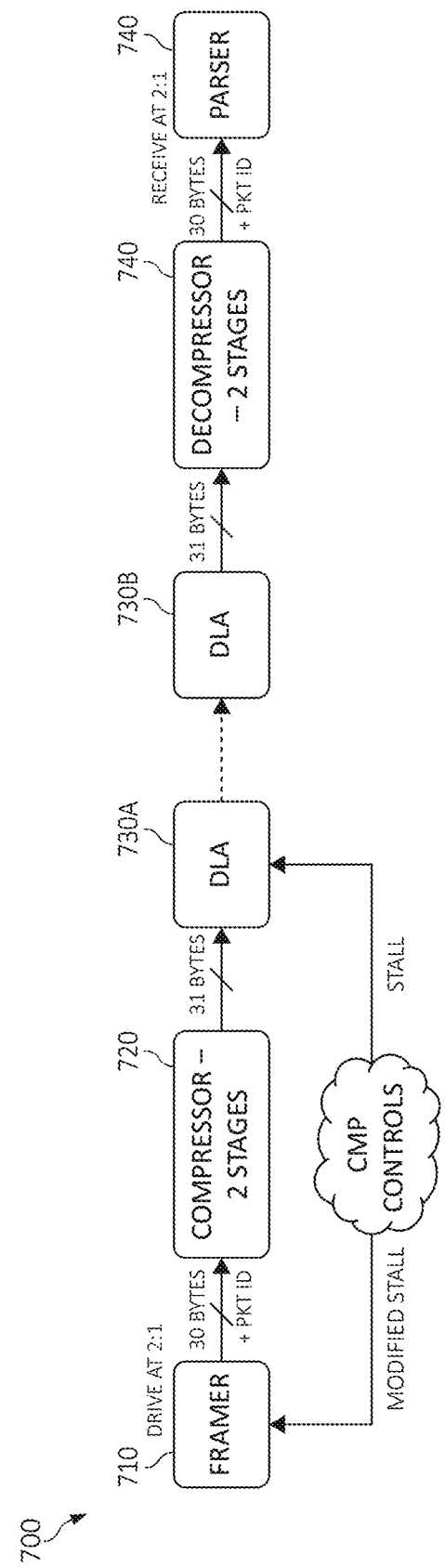
FIG. 7 is an additional block diagram depicting operations for compressing data in latency-critical processor links of a computing system in a computing environment according to an embodiment of the present invention.

In this way, the embodiments dynamically determine how much the next data should be compressed by (if at all), which allows scale a computing systems performance by transferring more data using the same link bandwidth, yet not compromising on the latency. While this change might add certain side-channels, one or more safeguards are provided against side-channels attacks.

FIG. 7 is an additional block diagram depicting operations for compressing data in latency-critical processor links of a computing system in a computing environment according to an embodiment of the present invention. In one aspect, one or more of the components, modules, services, applications, and/or functions described in FIGS. 1-6 may be used in FIG. 7. Repetitive description of like elements employed in other embodiments described herein is omitted for sake of brevity.

A network stack 700 is depicted that includes a framer 710, a compressor 720, and a data link layer (e.g., a data link adaptor 730 ("DLA") or also referred to as the DLL)), which may be associated with a processor core. It should be noted that "DLA" may be used interchangeable with "DLL." The DLA 730A may be in communication with an additional DLA such as, for example DLA 730B, which is associated with a decompressor 740 and a parser 750. In some implementations, the framer 710 and the DLA 730A may be in communication with one or more compression ("CMP") controls.

In operation, the framer 710 may receive incoming data (e.g., from a processor core). That is, the incoming packet may be 30 bytes and include a packet identifier ("ID"), which may indicate the packet type.

The framer 710 may indicates to the DLL (e.g., DLA 730A) a variety of parameters for compressing or not compressing the data. In one example, the framer 710 indicates to the DLA 730A at least three parameters; 1) a number of pending data packets (e.g., pending data), 2) a quality of service ("QoS"), and 3) a current packet type, where the current packet types are either a data packet or a control packet. In some examples, the stall signal from the link layer to the framer may be used to allow the DLL to control the flow rate of data. In one example, the link may not be ready to accept new packet due to certain error conditions in the link and the DLL will stall the framer. In some implementations, a modified version of the stall signal may be used to indicate the compression engine is busy processing the packets and no new packets should be driven in. As such, a modified stall signal is the original DLL stall along with any reasons the compression engine might have.

Based on these parameters, the compressor 720 may execute at least two stages: 1) a compression stage, or a non-compression stage. That is, in the non-compression stage, the compressor does not attempt compression on current packet types that are indicated as control packets. That is, cache lines indicated as control are not compressed. Rather, the compressor 720 passes the data (e.g., the cache line) through to the DLA 730A, based on the assumption that control packets are difficult to compress.

Alternatively, in the compression stage, the compressor 720 attempts compression on data depending on amount of data pending (e.g., pending data in a queue in the framer 710). For example, if there the amount of pending data is greater than a threshold, the compressor 720 will attempt to compress more cache lines. Alternatively, if the amount of pending data is less than a threshold, the compressor 720 will compress and zero-pad to packet size. For example, consider a situation where there are three packets P0, P1 and P2. Ideally, if all three packets can be compressed together, than only one packet is then transferred out. After compressing P0 and P1, it may be observed that P2 is unable to be compressed into the same packet and that it overflows. At this point, the compressed form of P0 and P1 (e.g., P0+P1) along with zeros added to reach the fixed packet size may be sent and transferred out. Then P2 may be sent out separately.

The compressor 720 also takes into account the quality of service ("QoS") required for compression. The QoS is an indication of how much additional latency can be added to that particular data packet (e.g., cache line) without having a negative system impact. A higher latency indicates the compressor 720 will try to pack more data (e.g., pack more cache lines) into a packet, else the compressor 720 will compress, zero-pad to packet size and flush earlier.

For example, as described in the P0, P1, P2 scenario earlier, another option for the compression engine is to take P0, P1, and P2 together and attempt a increase compression rather than process them separately. Compressing the packets individually is ideal for latency because there is no need to buffer multiple packets. However, compressing the packets together increase efficiency and can result in more compression at the cost of latency. The QoS factor indicates if that data can afford to be delayed, even if only slightly in order to identify a more efficient compression format. If the latency is critical, a decision may be executed to just send out the packet without processing.

For example, as an example of operations of FIG. 7, a transferring core (e.g., Tx side) bus may free up faster than normal number of processor clock signals ("pclks") earlier such as, for example, 28 pclks. Also, the operations of FIG. 7 may complete cache line transfer (256 bytes) in an nth number of pclks earlier/faster (e.g., complete cache line transfer 24 pclks earlier). Also, the bandwidth on average increases such as, for example, bandwidth increases up by 20%. On average, each oct-word ("OW") (32 bytes) reaches a number of pclks faster such as, for example, each OW reaches 10 pclk earlier. In one aspect, the first OW is 2 pclks delayed, while all others reach pclks early.

Figure 8:
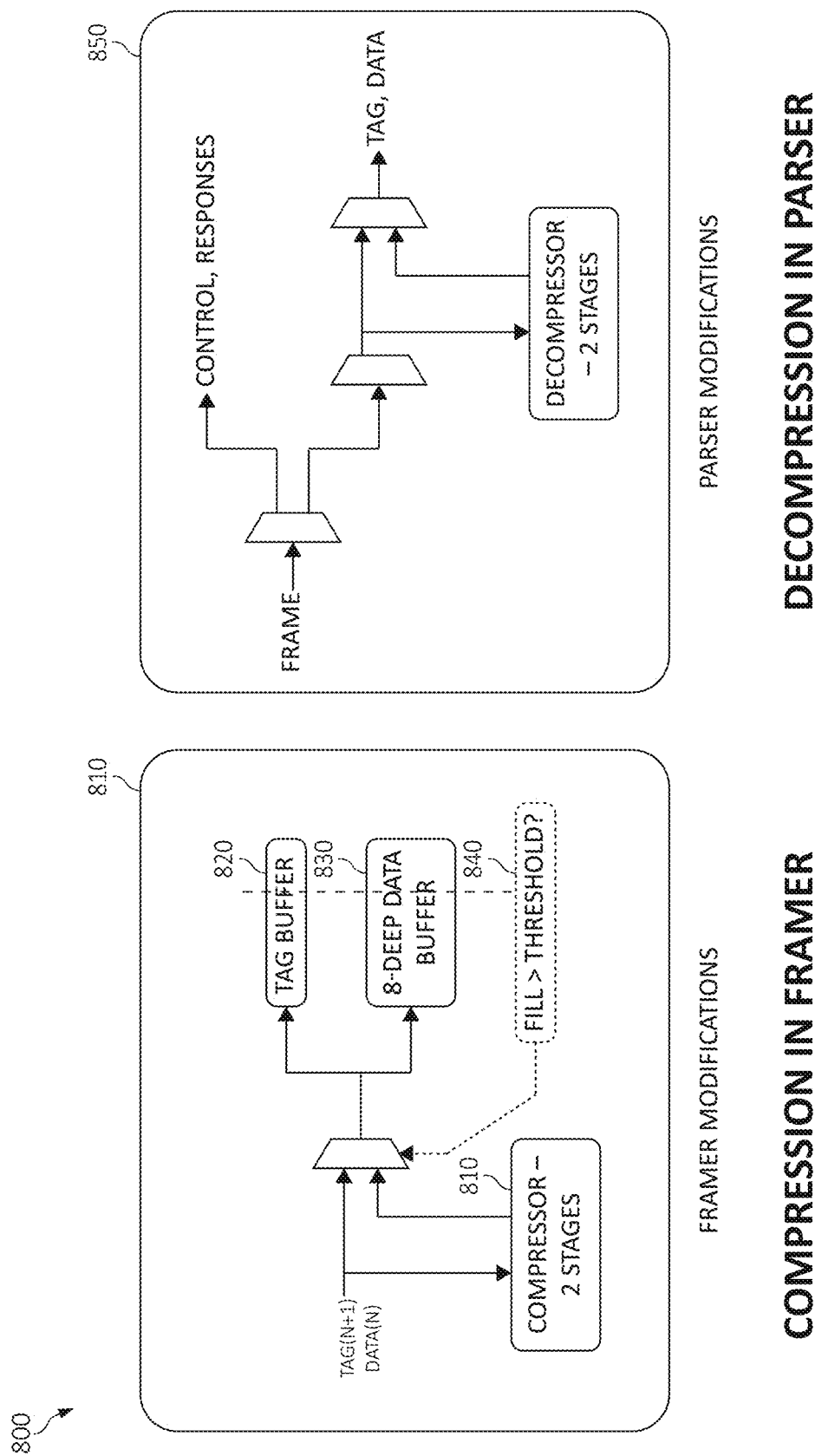
FIG. 8 is an additional block diagram depicting operations for compressing data in latency-critical processor links of a computing system with compression in a framer and decompression in a parser in a computing environment according to an embodiment of the present invention.

FIG. 8 is an additional block diagram depicting operations for compressing data in latency-critical processor links of a computing system with compression in framer with buss feedback (e.g., compression in a framer and decompression in a parser) in a computing environment according to an embodiment of the present invention. In one aspect, one or more of the components, modules, services, applications, and/or functions described in FIGS. 1-7 may be used in FIG. 8. Repetitive description of like elements employed in other embodiments described herein is omitted for sake of brevity.

As depicted, a compressor in a framer 810 may receive an input flow of data with a tag (n+1) and data (n). The compressor may tag a buffer and 8-deep data buffer. Assuming nest clock is equal to the processor core clock divided by two for the input flow rate (e.g., nest clock=processor core clock/2 input flow rate), and the link clock is equal to processor core clock divided by three for the output flow rate (e.g., link clock=processor core clock/3 output flow rate). That is, the cache (e.g., nest) is working half the speed of a processor core and the link is working one-third the speed of a processor core.

It should be noted that the threshold calculation may be similar to the previous case and the maximum compression to be attempted (e.g., 2×, 4×, 8×) may be determined as the fill level divided by the output flow rate.

Thus, given a packet, which may be received at 37 bytes, only twenty (20) bytes may be flushed. That is, the DLL framer fill rate is equal to 37 bytes ("B") per nest clock (37 B/nest clock). The DLL framer flush rate is equal to twenty bytes per nest clock (e.g., 20 B/nest clock).

A compressor of the framer (e.g., DLL compression) attempts to compress based on rate matching. That is, in some examples, the compressor of the framer 810 attempts the dynamic compression of the cache line by a compression rate (e.g., eight times '8×') if fill level is equal to or greater than 180 bytes. In some examples, the compressor of the framer 810 attempts the dynamic compression of the cache line by a compression rate (e.g., four times '4×') if fill level is equal to or greater than 100 bytes. In some examples, the compressor of the framer 810 attempts the dynamic compression of the cache line by a compression rate (e.g., two times '2×') if fill level is equal to or greater than 60 bytes.

In some examples, the compressor of the framer 810 does not compress the data and allows the data to pass through. In this way, the various embodiments provided the dynamic compression with no increase in latency on transmission of the cache line.

The framer 810 may send the compressed or non-compressed data to the parser 820 and the decompressor of the parser 820 may decompress the data.

For further example, various embodiments provided the dynamic compression and transmission ("Tx") frees up 9 pclks early per cache line. The receiving ("Rx") completes cache line transfer 4 pclks early (and the nominal latency for 1 cache line assuming everything else is idle). Also, the transmission of zero to tow OWs experience no additional latency on parser 820 output. A third OW may only be delayed by 2 pclks. The transmission of OW 4-7 may arrive earlier by 1, 2, 3, 4 pclks, respectively. Thus, the averaged over an isolated cache line, each OW arrives 1 pclks early. The averaged over multiple transactions, each OW arrives at least 7 pclks early.

Additionally, due to compression of cache lines, an attacker can mount an attack, which constantly flushes and reloads sensitive lines. Based on time taken for flushing and reloading, the attacker can determine compressibility of the lines, which leaks entropy. To overcome this vulnerability, the present invention may implement a bloom filter over a set of previously transferred cache line addresses. If the same cache line is moving back-and-forth too many times (programmable limit), then compression may be turned off (e.g., dynamic compression is toggled off). The dynamic compression may be turned on again if a computing system does not have a hot cache line getting flushed/reloaded too many times. The compression can also be turned on (e.g., dynamic compression is toggled on) again after a defined period of time.

Figure 9:
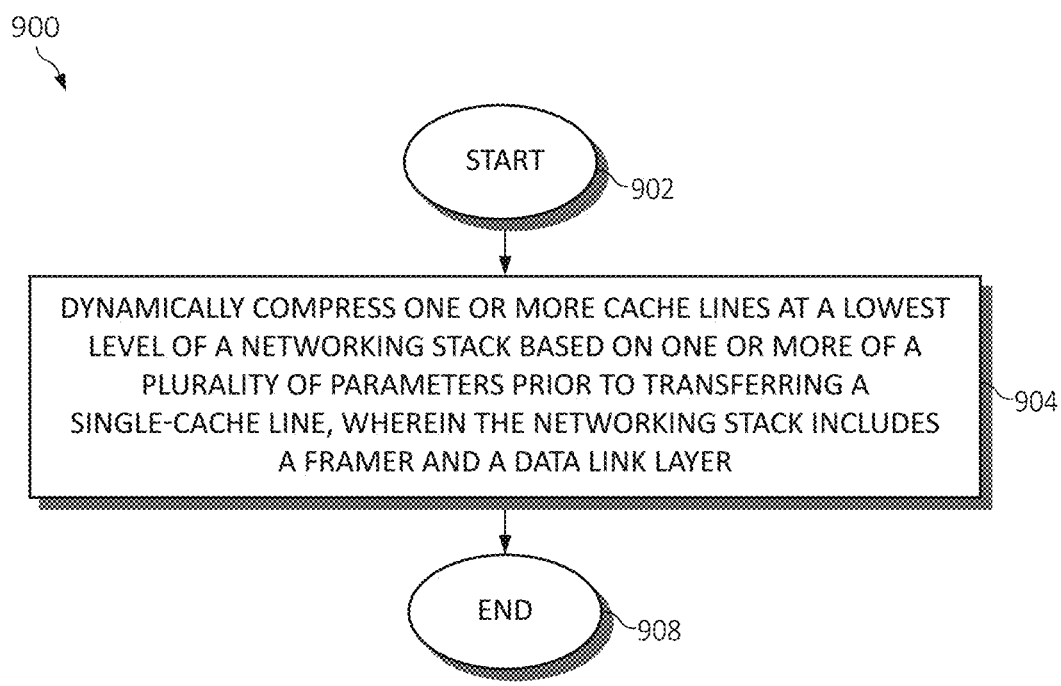
FIG. 9 is a is a flowchart diagram depicting an additional exemplary method for compressing data in latency-critical processor links of a computing system in a computing environment according to an embodiment of the present invention.

Turning now to FIG. 9, a method 900 for compressing data in latency-critical processor links of a computing system in a computing environment using a processor is depicted, in which various aspects of the illustrated embodiments may be implemented. The functionality 900 may be implemented as a method (e.g., a computer-implemented method) executed as instructions on a machine, where the instructions are included on at least one computer readable medium or one non-transitory machine-readable storage medium. The functionality 900 may start in block 902.

One or more cache lines may be dynamically compressed at a lowest level of a networking stack based on one or more of a plurality of parameters prior to transferring a single-cache line, where the networking stack includes a framer and a data link layer, as in block 904. The functionality 900 may end, as in block 906.

In one aspect, in conjunction with and/or as part of at least one blocks of FIG. 9, the operations of method 900 may include each of the following. The operations of method 900 may enable compression of the one or more cache lines based on a data in a queue above a defined threshold; or disable compression of the one or more cache lines based on data in a queue below a defined threshold.

The operations of method 900 may determine to compress the one or more cache lines based on the one or more of the plurality of parameters, wherein the plurality of parameters include a number of pending data packets, a quality of service ("QoS"), and a current packet type, wherein the current packet types are either a data packet or a control packet.

The operations of method 900 may feed data from the framer to the data link layer to determine an amount of data to compress based on the one or more of the plurality of parameters. The operations of method 900 may dynamically toggle the compression of the one or more cache lines using a bloom filter on a set of previously transferred cache line addresses. The operations of method 900 may dynamically compress the one or more cache lines to match a data input rate. The operations of method 900 may dynamically control the compression of the one or more cache lines based on a number of hot cache lines.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The descriptions of the embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for compressing data in latency-critical processor links of a computing system in a computing environment by one or more processors comprising:
    dynamically compressing one or more cache lines at a lowest level of a networking stack based on one or more of a plurality of parameters prior to transferring a single-cache line, wherein the networking stack includes a framer and a data link layer;
    enabling compression of the one or more cache lines based on a data in a queue above a defined threshold; and
    disabling compression of the one or more cache lines based on data in a queue below a defined threshold.

2. The method of claim 1, further including determining to compress the one or more cache lines based on the one or more of the plurality of parameters, wherein the plurality of parameters include a number of pending data packets, a quality of service ("QoS"), and a current packet type, wherein the current packet types are either a data packet or a control packet.

3. The method of claim 2, further including feeding data from the framer to the data link layer to determine an amount of data to compress based on the one or more of the plurality of parameters.

4. The method of claim 1, further including dynamically toggling the compression of the one or more cache lines using a bloom filter on a set of previously transferred cache line addresses.

5. The method of claim 1, further including dynamically compressing the one or more cache lines to match a data input rate.

6. The method of claim 1, further including dynamically controlling the compression of the one or more cache lines based on a number of hot cache lines.

7. A system for compressing data in latency-critical processor links of a computing system in a computing environment, comprising:
    one or more computers with executable instructions that when executed cause the system to:
        dynamically compress one or more cache lines at a lowest level of a networking stack based on one or more of a plurality of parameters prior to transferring a single-cache line, wherein the networking stack includes a framer and a data link layer;

enable compression of the one or more cache lines based on a data in a queue above a defined threshold; and disable compression of the one or more cache lines based on data in a queue below a defined threshold.

8. The system of claim 7, wherein the executable instructions when executed cause the system to determine to compress the one or more cache lines based on the one or more of the plurality of parameters, wherein the plurality of parameters include a number of pending data packets, a quality of service ("QoS"), and a current packet type, wherein the current packet types are either a data packet or a control packet.

9. The system of claim 8, wherein the executable instructions when executed cause the system to feed data from the framer to the data link layer to determine an amount of data to compress based on the one or more of the plurality of parameters.

10. The system of claim 7, wherein the executable instructions when executed cause the system to dynamically toggle the compression of the one or more cache lines using a bloom filter on a set of previously transferred cache line addresses.

11. The system of claim 7, wherein the executable instructions when executed cause the system to dynamically compress the one or more cache lines to match a data input rate.

12. The system of claim 7, wherein the executable instructions when executed cause the system to dynamically control the compression of the one or more cache lines based on a number of hot cache lines.

13. A computer program product for compressing data in latency-critical processor links of a computing system in a computing environment, the computer program product comprising:

one or more computer readable storage media, and program instructions collectively stored on the one or more computer readable storage media, the program instruction comprising:

program instructions to dynamically compress one or more cache lines at a lowest level of a networking stack based on one or more of a plurality of parameters prior to transferring a single-cache line, wherein the networking stack includes a framer and a data link layer;

program instruction to enable compression of the one or more cache lines based on a data in a queue above a defined threshold; and program instructions to disable compression of the one or more cache lines based on data in a queue below a defined threshold.

14. The computer program product of claim 13, further including program instructions to determine to:

compress the one or more cache lines based on the one or more of the plurality of parameters, wherein the plurality of parameters include a number of pending data packets, a quality of service ("QoS"), and a current packet type, wherein the current packet types are either a data packet or a control packet; and feed data from the framer to the data link layer to determine an amount of data to compress based on the one or more of the plurality of parameters.

15. The computer program product of claim 13, further including program instructions to dynamically toggle the compression of the one or more cache lines using a bloom filter on a set of previously transferred cache line addresses.

16. The computer program product of claim 13, further including program instructions to dynamically compress the one or more cache lines to match a data input rate.

17. The computer program product of claim 13, further including program instructions to dynamically control the compression of the one or more cache lines based on a number of hot cache lines.

* * * * *